3,632,537
PHENOLIC RESIN COMPOSITIONS AND PROCESS
Teo Paleologo, Silvio Vargiu, and Silvestro Pezzoli, Milan, Italy, assignors to Società Italiana Resin S.p.A., Milan, Italy
No Drawing. Filed Apr. 22, 1968, Ser. No. 723,309
Claims priority, application Italy, Apr. 29, 1967, 15,534/67
Int. Cl. C08g 51/72
U.S. Cl. 260—19                 3 Claims

ABSTRACT OF THE DISCLOSURE

A process for preparing a phenol/aldehyde moulding-sand resin is provided in which the aldehyde, preferably formaldehyde, and the phenol, preferably phenol itself, are condensed in the presence of an acid catalyst having a dissociation constant exceeding about $1.7 \times 10^{-5}$ until a resin having a phenol/aldehyde molar ratio of 1 to 0.9 to 1 to 0.4 and a melting point up to 80° C. is produced.

---

The invention relates to phenol resins, compositions of phenol resins which are particularly suitable as binders for molding sands, and the process for making same.

More particularly, the invention relates to phenol resins; to phenol resin compositions which are of low viscosity in a molten state and capable of quick hardening; to the process for making same; and to the products obtained by employing such resins for pre-coating molding sand without the use of solvents, at elevated temperatures.

Two processes are known in the art for pre-coating molding sand, which essentially differ in that the resin is used as such, or dissolved in a suitable solvent.

In the latter case the phenol resin of novolak type is dissolved and added to the molding sand in a quantity of 3–5% calculated on a dry basis. Hexamethylentetramine is then added and suitably stirred. The solvent is removed by a stream of air or other gas at a temperature ranging from room temperature up to about 100° C.

According to a modification of the process the molding sand is mixed with the resin in powder form and with hexamethylentetramine and the resin is subsequently dissolved by adding solvent which is finally evaporated as in the above described process.

However, this procedure suffers from drawbacks due to the use of volatile solvents; moreover, the process is expensive both because the pre-coating cycle on the sand is rather lengthy, generally 10 to 20 minutes, and because of the loss of solvent which is not normally recovered.

It is further known in the art to pre-coat the molding sand without the use of solvent by means of a heat-setting resin or, better, a mixture of phenol resin and hexamethylentetramine.

According to this process the solid phenol resin added in granulated form to the molding sand is melted on the sand at a temperature exceeding 100° C.

In actual practice the operation is carried out as follows: the heated sand is charged to a suitable mixer, the resin being added in a proportion of 2 to 5% wt./wt. of the sand. Hexamethylentetramine, usually in an aqueous solution, is then added, the whole being further stirred. By reason of the high temperature of the sand the resin melts and coats every granule of sand with a thin film.

A phenol resin suitable for pre-coating molding sand by this dry process should first of all be of low viscosity when in a molten condition as a readily flowable resin will lead to a quick and uniform coating of the sand particles.

The quickness of pre-coating saves time, the uniformity of the coating being of great importance as it reduces the quantity of resin employed and yields a sand the particles of which are homogeneously covered by resin.

A further important property of such resins resides in quickness of hardening to avoid peeling on molding.

Moreover, in order to operate economically the process, the least possible quantity of resin should be employed, considering that in the process of making foundry moldings the resin is the most expensive ingredient.

Further, the quantity of resin employed should not adversely affect the properties of the finished product, which should be of an adequate strength for the purpose.

Finally, the sand paritcles coated with resin should be readily flowable and be suitable for storage during prolonged periods of time without any deterioration.

All these requirements, which are very difficult to meet simultaneously, should additionally be met by a process for synthesising the resin as simply and inexpensively as possible.

It is an object of the invention to provide phenol resin compositions which are of low viscosity when in a molten condition, which are quick hardening, and which are suitable for pre-coating sand without the use of solvents.

It is a further object of the invention to provide a coated sand which leads to foundry cores of high mechanical properties notwithstanding a low resin/sand ratio.

It is a further object of the invention to provide a process which is simple and economically convenient for preparing phenol resins suitable for the above described purposes.

Accordingly the invention provides a process whereby a phenol and an aldehyde are reacted in the presence of 0.1–5.0% based on the weight of phenol of an acid catalyst having a dissociation constant higher than about $1.7 \times 10^{-5}$ until in the resulting resin the molar ratio of the phenol and aldehyde components ranges between 1 to 0.4 and 1 to 0.9 and the melting point does not exceed 80° C.

Among phenol compounds phenol is preferred, though derivatives thereof having the ortho and para-positions free (e.g. 3-methyl-phenol, 3,5-dimethylphenol, 3-ethyl-phenol and 3,5-diethyl-phenol) may be employed.

Among aldehyde compounds formaldehyde is preferred and can be utilized either as Formalin, or in the form of low molecular weight polymers such as paraformaldehyde, or of substances capable of providing free formaldehyde under reaction conditions.

Among the acid catalysts which are added in quantity of 0.1 to 5.0% by weight with respect to the phenol compound, oxalic acid is preferred. However for example, formic acid, acetic acid, benzoic acid or citric acid may be used, if desired.

The condensation reaction of the aldehyde and phenol suitably takes place at a temperature between 80° and 160° C., the preferred embodiment operating by total reflux and for a reaction period of time which reduces the free aldehyde, particularly formaldehyde, to values lower than about 1.5% by weight.

On completion of the condensation reaction, water in the reaction medium is distilled off, allowing the temperature of the mass at the base to rise to values up to about 160° C.

To produce the resin composition, whilst maintaining the reaction mass at the said temperature, a lubricating substance is then added, which suitably consists of salts of stearic acid, or esters or amides thereof or natural or synthetic waxes, or the conventional substances in the art.

These compounds, among which zinc stearate is preferred, are preferably present in the finished product by 1 to 8% by weight with respect to the phenol, and exert several functions. They promote fluidity of the resin and hence the coated sand is more flowable, thereby assisting in emptying the hollow matrix used in mold forming and facilitating release from the molds.

3. A method as claimed in claim 1 wherein the amide is used in an amount of 85–110% of the theoretical amount in respect of the free isocyanate groups present in the prepolymer.

4. A method as claimed in claim 1 wherein the reaction of the prepolymer with the oligoamide is conducted at a temperature of 0° C. to 120° C.

5. A method as claimed in claim 1 wherein the solvent is selected from the group consisting of N,N-dimethylformamide, N,N-dimethylacetamide, dimethylsulfoxide and hexamethylenesulfonamide which can dissolve the resulting block copolymer.

6. A method as claimed in claim 1 wherein the reaction of the prepolymer with the oligoamide is conducted in the presence of a catalyst.

7. A method as claimed in claim 6 wherein the catalyst is selected from the group consisting of stannous chloride, stannic chloride, di-n-butyl tin dilaurate, ferrous acetyl acetonate and lead oleate.

8. A block copolymer as prepared by the method of claim 1.

9. A block copolymer prepared by reacting a difunctional compound having active hydrogen atoms and an average molecular weight of 500–20,000 with an excess of an organic diisocyanate compound to prepare a prepolymer having terminal isocyanate groups, and reacting the formed prepolymer with an aromatic oligoamide having an average molecular weight of 300–5000 and a melting point not lower than 100° C., said oligoamide being selected from the group consisting of the compounds of the formulae:

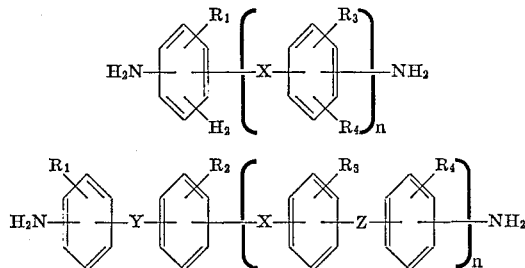

wherein each of $R_1$, $R_2$, $R_3$ and $R_4$ is a member selected from the group consisting of hydrogen, halogen atoms and alkyl groups have 1–4 carbon atoms, X is —NRCO— or —CONR— wherein R is a member selected from the group consisting of hydrogen, halogen atoms, alkyl groups having 1–4 carbon atoms, each of Y and Z is a single bond connecting the adjacent phenylene groups or a divalent group selected from the class consisting of —O—, —SO$_2$—, —CO— and

wherein each of R' and R" is a member selected from the class consisting of hydrogen, halogen atoms or alkyl groups having 1–4 carbon atoms, and $n$ is a number of at least one.

10. A block copolymer according to claim 9 wherein the oligoamide is selected from the group consisting of the compounds of the following formulae:

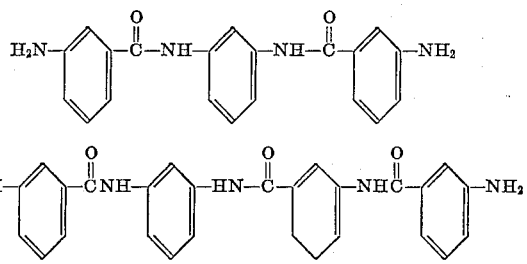

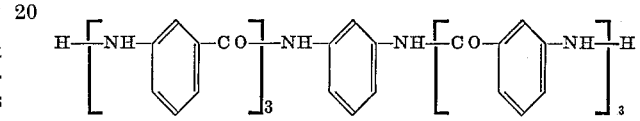

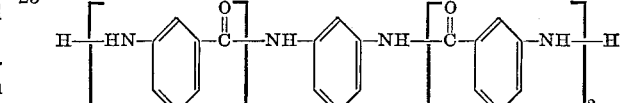

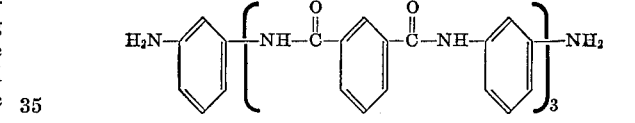

and

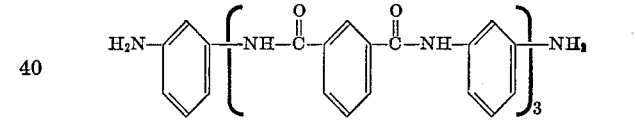

11. A block copolymer according to claim 9 wherein the amide is used in an amount of 85–110% of the theoretical amount in respect to the free isocyanate groups present in the prepolymer.

12. A block copolymer according to claim 9 wherein the reaction of the prepolymer with the oligoamide is conducted at a temperature of 0° C. to 120° C.

References Cited
UNITED STATES PATENTS

| | | | |
|---|---|---|---|
| 3,245,961 | 4/1966 | Fetscher et al. | 260—77.5 |
| 3,375,299 | 3/1968 | Levine et al. | 260—830 |
| 3,405,162 | 10/1968 | Kuryla | 260—465.6 |
| 3,428,710 | 2/1969 | Daumiller et al. | 260—857 |

DONALD E. CZAJA, Primary Examiner

H. S. COCKERAM, Assistant Examiner

U.S. Cl. X.R.

161—190; 260—30.4, 30.8, 32.6, 75 NH, 77.5 AM, 77.5 SP, 78 A, 78 R, 859